United States Patent
Dalcher

(10) Patent No.: US 9,613,212 B2
(45) Date of Patent: Apr. 4, 2017

(54) EXECUTION PROFILE ASSEMBLY USING BRANCH RECORDS

(71) Applicant: MCAFEE, INC., Santa Clara, CA (US)

(72) Inventor: Gregory William Dalcher, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 34 days.

(21) Appl. No.: 14/129,245

(22) PCT Filed: Mar. 5, 2013

(86) PCT No.: PCT/US2013/029118
§ 371 (c)(1),
(2) Date: Dec. 24, 2013

(87) PCT Pub. No.: WO2014/137324
PCT Pub. Date: Sep. 12, 2014

(65) Prior Publication Data
US 2015/0199516 A1 Jul. 16, 2015

(51) Int. Cl.
*H04L 9/00* (2006.01)
*G06F 21/56* (2013.01)
*G06F 21/54* (2013.01)
*G06F 21/55* (2013.01)

(52) U.S. Cl.
CPC .......... *G06F 21/566* (2013.01); *G06F 21/54* (2013.01); *G06F 21/554* (2013.01); *G06F 2221/031* (2013.01); *G06F 2221/034* (2013.01)

(58) Field of Classification Search
CPC ...................... H04L 41/0803; G06F 17/30144
See application file for complete search history.

(56) References Cited

U.S. PATENT DOCUMENTS

| 2001/0043604 A1* | 11/2001 | Li et al. ................. 370/395 |
| 2005/0223363 A1 | 10/2005 | Black-Ziegelbein et al. |
| 2006/0015852 A1 | 1/2006 | Parkinson et al. |
| 2012/0151452 A1* | 6/2012 | Zinkovsky et al. .......... 717/129 |
| 2012/0210437 A1* | 8/2012 | Karande ............... G06F 21/54 726/26 |
| 2012/0255012 A1* | 10/2012 | Sallam .................... 726/24 |

(Continued)

FOREIGN PATENT DOCUMENTS

| WO | 2005/121953 A1 | 12/2005 |
| WO | 2014/137324 A1 | 9/2014 |

OTHER PUBLICATIONS

International Search Report and Written Opinion received for PCT Application No. PCT/US2013.029118, mailed on Dec. 9, 2013, 9 pages.

*Primary Examiner* — Josnel Jeudy
(74) *Attorney, Agent, or Firm* — Baker Botts L.L.P.

(57) ABSTRACT

Technologies for assembling an execution profile of an event are disclosed. The system and method may include recording a plurality of branch records, generating a first test event substantially identical to the event, verifying legitimacy of an owner of a code segment associated with the event, establishing an initial point of an execution chain associated with the event, establishing a final point of the execution chain associated with the event, analyzing branch records for an address associated with the code segment, installing a plurality of primary monitors within the execution chain associated with the event, and triggering the plurality of primary monitors.

18 Claims, 4 Drawing Sheets

(56) References Cited

U.S. PATENT DOCUMENTS

| | | |
|---|---|---|
| 2012/0260344 A1 | 10/2012 | Maor et al. |
| 2013/0047141 A1 | 2/2013 | Shann et al. |
| 2013/0212489 A1* | 8/2013 | Ivashin ................... G06F 3/038 715/753 |
| 2013/0276110 A1* | 10/2013 | Dalcher ................ G06F 21/554 726/23 |
| 2014/0129880 A1* | 5/2014 | Gopalakrishnan .. G06F 11/0715 714/38.11 |
| 2015/0067763 A1* | 3/2015 | Dalcher ................ G06F 21/566 726/1 |

* cited by examiner

EXECUTION PROFILE ASSEMBLY USING BRANCH RECORDS

TECHNICAL FIELD

This invention relates generally to the field of electronic security and more specifically to creating a full execution profile using branch records.

BACKGROUND

In the realm of electronic security, electronic security products often find themselves one step behind the proprietor and distributors of harmful software. Many traditional approaches to electronic security take as their starting point the identification of threats and reaction to these threats. This reactive approach may protect electronic devices against known threats, but leaves them vulnerable to unknown threats. Further, this reactive approach requires constant vigilance and updating of the electronic device in order to keep up with the latest advancements in harmful software.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

In modern electronic systems, one major issue remains electronic security. A constant threat to the security of an electronic system is the threat of assimilation of system resources through means other than those intended by the user of the system. These means may take the form of software, hardware, firmware, or some combination thereof, and may include computer viruses, worms, spyware, adware, or other means that may gather information from an infected electronic device, corrupt the device, or have some other deleterious effect. These means may be generally referred to as "malware."

One particularly nefarious breed of malware may insert itself into electronic device's event processing routines in order to subvert, monitor, and/or alter these processes. For example, a key-stroke logging software may be inserted into the handling of keystrokes in order to capture these keystrokes.

Malware may be generally characterized by a need to be inserted into the handling of an event of some sort, even if only to be scheduled for execution by the system. Detecting malware's presence in an event processing is valuable, but often difficult. For example, malware may be included in an event's processing by indirect methods such as taking advantage of a vulnerability of the electronic device itself (an "exploit"). Some prior electronic security software has been able to discover which insertion methods may be used and monitoring these insertion methods (e.g., the known vulnerabilities). For example, in the case of a key-stroke logger, the method of insertion may be an exploit of an application programming interface ("API"). One historic method of dealing with this vulnerability has been to monitor the API in order to detect subversion of the normal operation.

Reactive approaches to detection such as this may make it difficult to keep pace with changes to malware insertion techniques. An improved approach may be one that allows for detection of the presence of malware in an event's processing regardless of the insertion method. Additionally, it may be beneficial to also support using assembled execution profiles to validate the invoker of an API (such as a privileged API).

Figure 1:
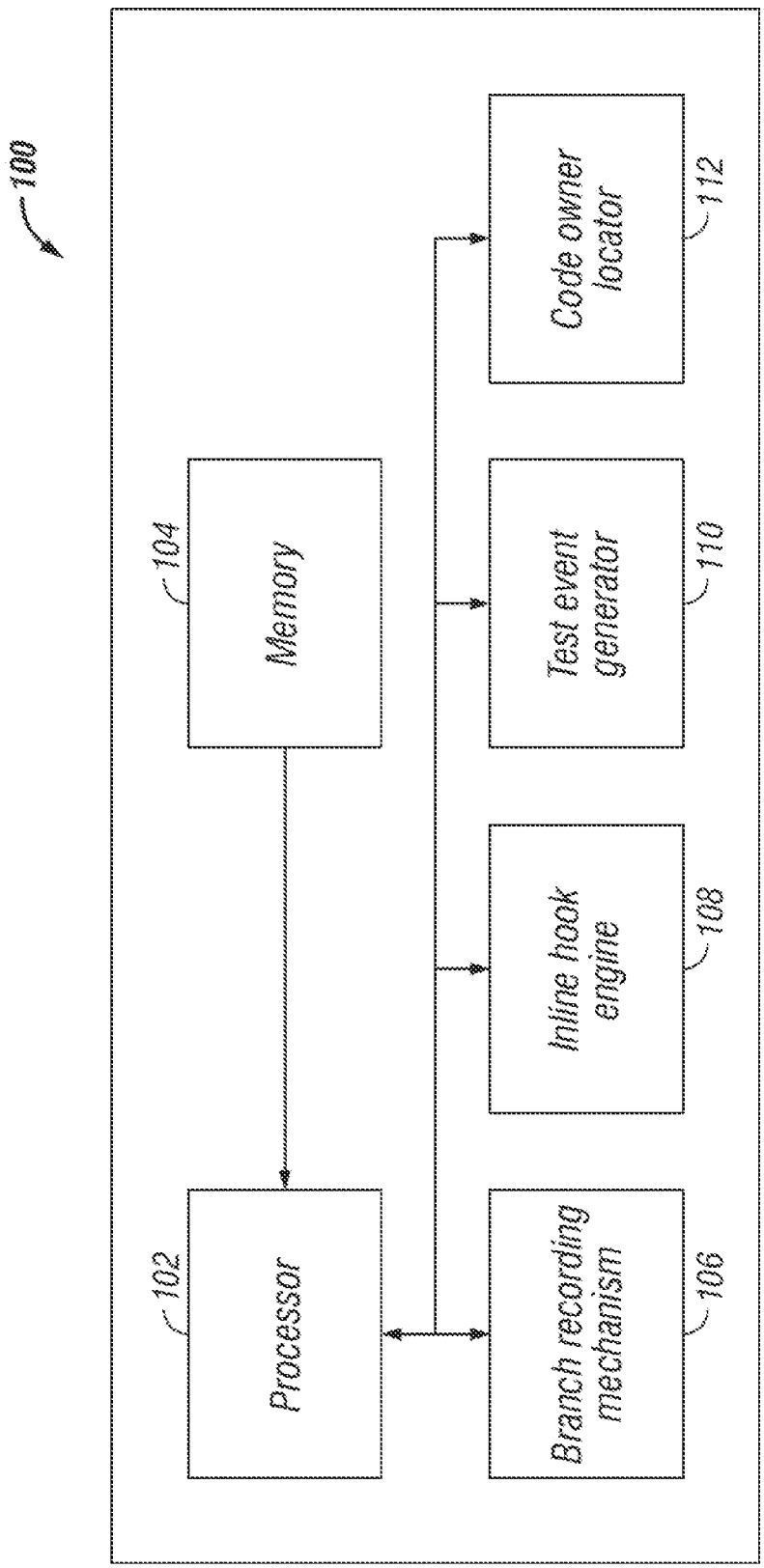
FIG. 1 illustrates an example system for detecting the presence of malware in an event's processing regardless of the insertion method, in accordance with certain embodiments of the present disclosure.

FIG. 1 illustrates an example system 100 for detecting the presence of malware in an event's processing regardless of the insertion method, in accordance with certain embodiments of the present disclosure. System 100 may include processor 102, memory 104, branch recording mechanism 106 communicatively coupled to processor 102, inline hook engine 108 communicatively coupled to processor 102, test event generator 110 communicatively coupled to processor 102, and code owner locator 112 communicatively coupled to processor 102.

In some embodiments, system 100 may take advantage of what are known as "branch records" to assemble execution profiles. For example, branch records may be lists of execution branches that have occurred (e.g., jumps, calls, etc.). Branch records may typically be provided by processor 102. However, one of ordinary skill in the art will appreciate that the branch record could also be provided by other components of system 100 such as a virtualization or emulation environment.

Historically, a challenge facing the use of branch records has been that their depth is limited. For example, on Intel i7 CPUs the depth of the record is 16 entries. On older Intel CPUs the depth is even less. One approach to addressing the depth of the records has been to extend the recording of the branch records by offloading the branch records to memory 104. However, given other operating constraints of system 100, this may still limit the depth of branch records that may be recorded, as well as incurring a performance penalty for the other operations required of system 100.

In some embodiments, system 100 may include branch recording mechanism 106. For example, system 100 may include the Last Branch Record ("LBR") mechanism supported by Intel CPUs. Other branch recording mechanisms 106 may be used without departing from the scope of the present disclosure.

In some embodiments, system 100 may also include inline hook engine 108. In order to effectively monitor the execution of code that is of interest, system 100 may implement hooks. Inline hook engine 108 may be configured to place these hooks in line with code to be monitored. For example, in-line hooks may comprise replacement instructions placed within the monitored code, where the in-line hook may transfer control of the monitored code to a callback function when the hooked code is executed. These hooks may be placed and executed in any appropriate operating mode of system 100, including kernel and user modes. In some configurations of system 100, inline hook engine 108 may be further configured to place the in-line hooks in a manner that may avoid anti-hook mechanisms resident on system 100. For example, in a configuration of system 100 in which system 100 has implement Patch Guard for Windows, it may be necessary to avoid the anti-hook mechanisms when placing kernel mode hooks.

In the same or alternative embodiments, inline hook engine 108 may be configured to allow monitoring of execution and/or access of an address through the use of a technique other than inline hooks. For example, virtualization-based monitoring of access and/or execution of an address; CPU-based monitoring of access and/or execution of an address; and/or other hardware-based monitoring of access and/or execution of an address.

In some embodiments, system 100 may also include test event generator 110 Test event generator 110 may be configured to generate test events in order to assemble an execution profile of the code involved in handling a normal event of the same type. For example, test event generator 110 may generate test events such as keystroke events. Test event generator 110 may be configured to generate a test event through a variety of methods, including: (1) invoking an API to queue up an input-output ("I/O") operation; (2) generating a hardware or software interrupt; and/or (3) retrieving the address of the registered handler of an interrupt and invoking that code as it would be during the handling of the interrupt.

In some embodiments, system 100 may also include code owner locator 112. Code owner locator 112 may be configured to identify the "owner" of code found at a particular address. In some configurations, the code address may be retrieved through execution profiling, as described in more detail above. Code owner locator 112 may be configured to first check an address range for code originating from loaded modules such as executables, libraries (e.g. DLLs in Windows), and device drivers. This may assist code owner locator 112 in distinguishing static code from code in runtime-allocated memory.

Code owner locator 112 may also be configured to check an address range for memory allocated at runtime by running process and device drivers. For example, code owner locator 112 may be configured to monitor memory allocations and assemble a list of the location(s) and range(s) of the allocations. In some configurations of system 100, code owner locator 112 may perform this check through the implementation of monitoring callbacks supplied by the operating system of system 100, and/or a more direct monitoring via in-line hooking.

In some embodiments, code owner locator 112 may be further configured to validate the owner previously identified and that the owner's participation in the handling of a test event is legitimate. For example, code owner locator 112 may be configured to determine whether the executable for the identified owner is signed and signed by a trusted source, whether the executable is normally expected to be part of handling of the test event's particular type, whether the origins of the executable are suspicious; and/or whether the running executable (process, device driver) has been tampered with.

In operation, system 100 may be configured to assemble execution profiles for various types of events. For example, system 100 may be configured to assemble execution profiles for events such as a keystroke event, an API call (e.g., the API to enumerate running processes on a system), and/or any key event malware may need for operation (e.g., thread execution being resumed by the operating system's scheduler).

To aid in understanding, the following example is provided. Although this example provides certain details, it will be understood by one of ordinary skill in the art that system 100 may be configured in different ways without departing from the scope of the present disclosure. APIs have increasingly become useful in allowing different types of applications to communicate with one another. It may therefore be beneficial to validate that the invoker of an API is a legitimate user of the API. Some prior method, such as return oriented programming ("ROP") may make simply checking the code/code origin of the invoker insufficient as legitimate code may be hijacked using ROP to invoke the API on behalf of malware.

By assembling an execution profile of the invocation of the API, system 100 may establish a much greater confidence that the invoker is legitimate. In operation, in order to assemble an execution profile, test event generator 110 may substitute a test event for the exit of the API. This exit may be re-issued as needed to expose more of the invocation's execution profile, as described in more detail below.

For example, inline hook engine 108 may be configured to determine the hook entry point(s) for an API whose invocation is to be validated. In the same or alternative configurations, the entry point may invoke inline hook engine 108. Similarly, inline hook engine 108 may be configured to determine the hook exit point(s) for the API. In the same or alternative configurations, the exist point may invoke inline hook engine 108.

Upon the invocation of any hook point, inline hook engine 108 may be further configured to identify the process and/or thread invoking the API. If the hook is for the entry point of API, inline hook engine 108 may save the process and/or thread information for matching against other hook point invocations. If the hook is for an API exit point or a secondary hooks, inline hook engine 108 may compare the process and/or thread information to that saved from entry point hook invocation.

Inline hook engine 108 may then be configured to extract code addresses from the call stack at the point of API invocation. In some configurations, inline hook engine 108 may extract code address from branch recording mechanism 106. Inline hook engine 108 may exclude any from other threads' execution as well as any addresses already seen and monitored, as described in more detail below with reference to FIGS. 3-4.

Next, inline hook engine 108 may place secondary hooks at the extracted code address, as described in more detail below with reference to FIGS. 3-4. If the hook invoked is for exit from API, inline hook engine 108 may save the execution state (stack, registers, etc.) for later restoration. In some embodiments, inline hook engine 108 may also be configured to place secondary hooks at addresses discovered through examination of branch records at the point of invocation of a previously placed hooks, as described in more detail below with reference to FIGS. 3-4.

As the API execution continues, further hooks may be triggered. If the exit point for API has already been reached by the process and/or thread being tracked, inline hook engine 108 may queue a re-issuing of the exit. In such a circumstance, inline hook engine 108 may be configured to restore the execution state (e.g., stack, registers, etc.) and restart execution from the API exit point. This may allow more identified hook points identified to be reached.

Execution from the exit point may be triggered for a predetermined number of iterations. As execution continues, secondary hook points may be hit, exposing more code addresses via the stack walk and branch record analysis, allowing a deeper walk back into the invocation of the API with each iteration.

Code owner locator 112 may be configured to determine the owners of the analyzed code and validate that these are legitimate users of the API, as described in more detail below with reference to FIGS. 3-4. Code owner locator 112 may be further configured to create a security violation if the owners of the code are not validated.

By examining the branch records and installing hooks in this iterative fashion, system 100 may address the depth limitations of branch records, allowing for application to assembly of execution profiles. Further, system 100 may not require as much updating as prior solutions (e.g., to monitor newly-discovered APIs to be exploited by malware). Still further, system 100 may be used to check for malware bypassing of API monitoring and operating system-supported filtering (e.g., file system filters, Registry filters, etc.). With the ability to create execution profiles for APIs, system 100 may be used to harden privileged APIs against unauthorized use by malware.

Figure 2:
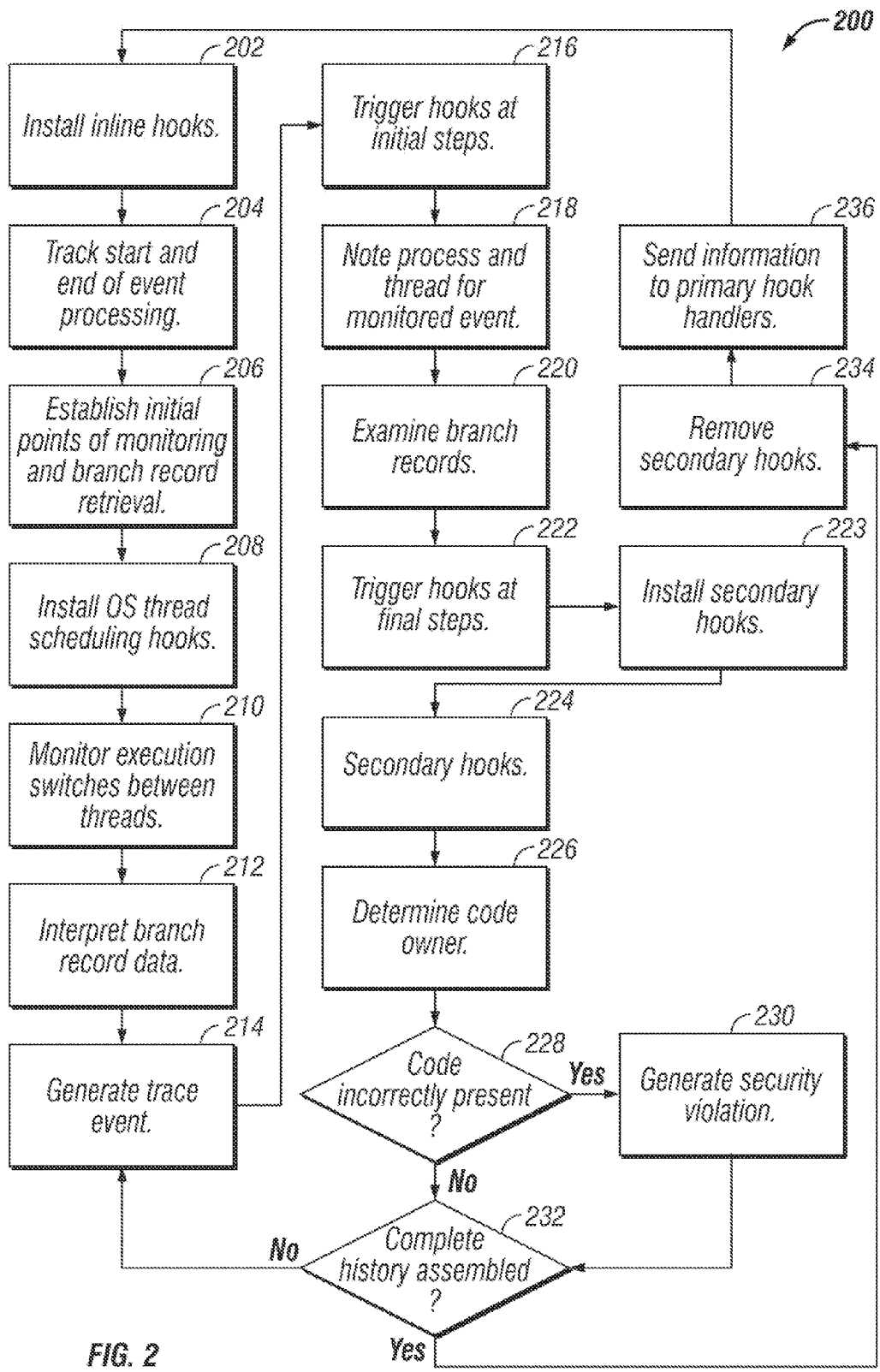
FIG. 2 illustrates a flowchart of an example method for assembling execution profiles using branch records, in accordance with certain embodiments of the present disclosure.

FIG. 2 illustrates a flowchart of an example method 200 for assembling execution profiles using branch records, in accordance with certain embodiments of the present disclosure. Method 200 includes establishing beginning and end points of a monitored event, generating a test event, examining the branch records to build an execution profile, and verifying ownership of the code in question.

According to one embodiment, method 200 preferably begins at step 202. Teachings of the present disclosure may be implemented in a variety of configurations. As such, the preferred initialization point for method 200 and the order of steps 202-236 comprising method 200 may depend on the implementation chosen.

In some embodiments, the steps of method 200 may be performed by some or all of the components of system 100, as described in more detail above with reference to FIGS. 1-2. For example, in some configurations, inline hook engine 106 may be responsible for installing hooks at key points in the event processing chain. In other configurations, these steps may be performed by different components of system 100 with departing from the scope of the present disclosure.

At step 202, method 200 may install inline hooks at certain points in an event's processing. As described in more detail above with reference to FIGS. 1-2, the hooks may be installed at points determined by inline hook engine 106 to be important in the event processing. For example, method 200 may install inline hooks at the following locations: (1) APIs used to queue up the event (e.g., the APIs used by a keyboard driver to insert keystroke codes into a queue for processing); (2) APIs used by consuming code to retrieve the event (e.g., APIs used by application-level software to retrieve the queued keystrokes); and (2) APIs used to invoke registered callbacks during the course of processing the event (e.g., operating system-supported callbacks invoked during course of processing keystrokes that may allow for keystroke filter drivers, etc.). After installing the inline hooks, method 200 may proceed to step 204.

At step 204, method 200 may use the installed inline hooks to track the start and end of processing for a particular event. Once this monitoring has begun, method 200 may proceed to step 206. At step 206, method 200 may use the data gathered during monitoring to establish initial points of monitoring and branch record retrieval which may be built upon while assembling the execution profile for the handling of the event. After establishing these initial points, method 200 may proceed to step 208.

At step 208, method 200 may install inline hooks at key points in the operating system's scheduling of threads. For example, method 200 may install inline hooks at the following locations: (1) APIs used by threads to yield execution back to system (e.g., when waiting for I/O); and (2) code used by system 100 to schedule a thread for execution (e.g., task switching and launching of new threads). After installing the inline hooks, method 200 may proceed to step 210.

At step 210, method 200 may use the installed inline hooks to monitor when execution switches between threads. Once this monitoring has begun, method 200 may proceed to step 212. At step 212, method 200 may use the data gathered during monitoring to interpret the data present in the branch record, which may cover branches for all threads running on processor 102. After interpreting the data in the branch record, method 200 may proceed to step 214.

At step 214, method 200 may generate a trace event, sending the trace event to the initial step of the event handling chain. For example, in the case of keystroke events, method 200 would send the trace event to the lowest portion of the keystroke event processing stack. After generating the trace event, method 200 may proceed to step 216.

At step 216, method 200 may trigger the hooks at the initial step of an event handling chain. For example, as described in more detail above with reference to step 202, hooks may be placed within APIs used to queue up an event. In the case of keystroke events, these hooks may trigger, therefore picking up the keystroke event being submitted to the stack. After triggering these initial hooks, method 200 may proceed to step 218.

At step 218, method 200 may note the process and thread in effect for the monitored event, as well as note that a trace event is being processed for this process/thread. This may allow recognition of which subsequent event processing interceptions relate to the trace event as opposed to other related, real events happening. After noting the process in effect, method 200 may proceed to step 220.

At step 220, method 200 may examine the recorded branch records. In some embodiments, each branch record entry points to code. In some configurations, the branch record may point to a transfer address. In the same or alternative configurations, the branch record may point to a source address. For example, in the case of the Intel i7 LBR, each branch record entry may contain the address of execution before and after the taking of the branch. These code addresses may be saved for further processing. After examining the recorded branch records, method 200 may proceed to step 222.

At step 222, method 200 may trigger inline hooks at a final portion of an event's processing chain. For example, as described in more detail above with reference to step 202, method 200 may install hooks at APIs used by consuming code to retrieve an event. In the case of a keystroke event, for example, method 200 may trigger an inline hook at retrieval of a queued keystroke by a user mode application. The triggering of inline hooks at the final portion of an event's processing chain is described in more detail below with reference to FIG. 4. After triggering these hooks, method 200 may proceed to step 223.

At step 223, method 200 may include installing secondary hooks. As described in more detail above with reference to FIG. 1 and below with reference to FIGS. 3-4, secondary hooks may be installed at addresses based on, for example, addresses discovered through examination of branch records, examination of a callback stack at a point of invocation of hooks, etc. After installing the secondary hooks, method 200 may proceed to step 224.

At step 224, method 200 may include handling secondary hooks, as described in more detail below with reference to FIGS. 3-4. After handling secondary hooks, method 200 may proceed to step 226.

At step 226, method 200 may determine the owners of the code from the code addresses retrieved from the branch records, as described in more detail above with reference to steps 214-224 and as described in more detail above with reference to FIGS. 1-2. After determining the owners of the code, method 200 may proceed to step 228.

At step 228, method 200 may determine the legitimacy of the code and its owner in the handling of the test event, as described in more detail above with reference to FIGS. 1-2. If the code is determined to be incorrectly present in the handling of a test event, method 200 may proceed to step 230, where a security violation may be generated. After generating the security violation, method 200 may proceed to step 232. If the code is not determined to be incorrectly present in the handling of a test event, method 200 may proceed to step 232.

At step 232, method 200 may determine whether a complete history of the execution flow of handling the trace event has been assembled. By repeating the trace event as described in more detail above with reference to steps 202-230 and below with reference to FIGS. 3-4, limitations on the depth of branch records may be avoided while still assembling the execution profile of a trace event. If a complete history has not been assembled, method 200 may return to step 214. If a complete history has been assembled, method 200 may proceed to step 234.

At step 234, secondary hooks may be removed. After removing the secondary hooks, method 200 may proceed to step 236. At step 236, method 200 may send information to the primary hook handlers that a trace event is no longer in process. After sending this information, method 200 may return to step 202.

Although FIG. 2 discloses a particular number of steps to be taken with respect to method 200, method 200 may be executed with more or fewer steps than those depicted in FIG. 2. In addition, although FIG. 2 discloses a certain order of steps comprising method 200, the steps comprising method 200 may be completed in any suitable order. For example, in the embodiment of method 200 shown, inline hooks are inserted in a serial manner. However, in some configurations it may be necessary or desirable to insert these hooks in a parallel manner for more efficient processing.

Figure 3:
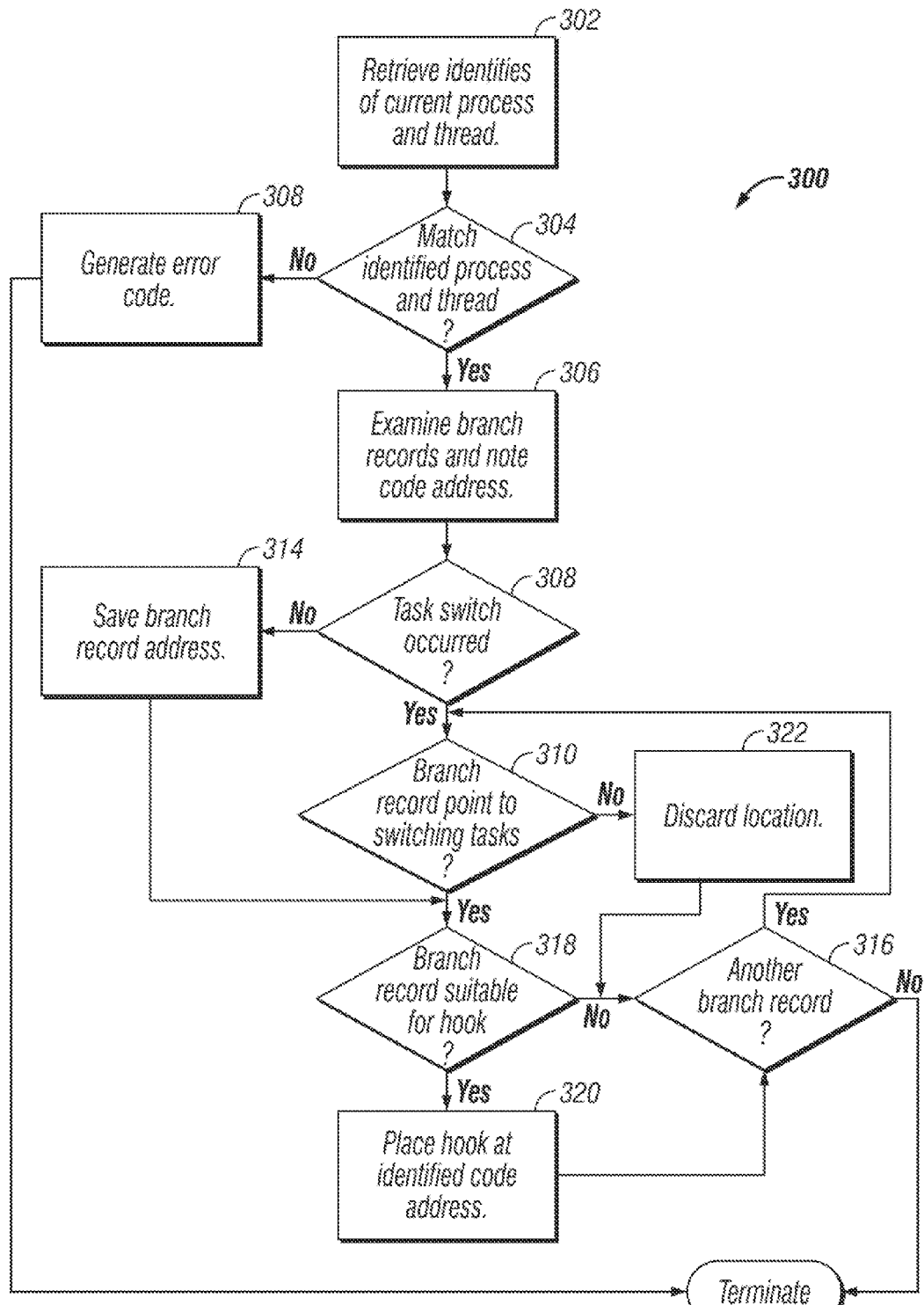
FIG. 3 illustrates a flowchart of an example method for triggering hooks at the final portion of an event handling chain, in accordance with certain embodiments of the present disclosure.

FIG. 3 illustrates a flowchart of an example method 300 for triggering hooks at the final portion of an event handling chain, in accordance with certain embodiments of the present disclosure. Method 300 may include examining the branch records, discarding locations associated with switching tasks, and determining whether the branch record address is a suitable location for a hook. The steps of method 300 generally correspond with step 222 of method 200, as described in more detail above with reference to FIG. 2.

According to one embodiment, method 300 preferably begins at step 302. Teachings of the present disclosure may be implemented in a variety of configurations. As such, the preferred initialization point for method 300 and the order of steps 302-320 comprising method 300 may depend on the implementation chosen.

In some embodiments, the steps of method 300 may be performed by some or all of the components of system 100, as described in more detail above with reference to FIGS. 1-2. For example, in some configurations, inline hook engine 108 may be responsible for examining branch records. In other configurations, these steps may be performed by branch recoding mechanism 106 and/or different components of system 100 with departing from the scope of the present disclosure.

At step 302, method 300 may retrieve the identities of the current process and thread. After retrieving the identities, method 300 may proceed to step 304. At step 304, method 300 may determine whether the retrieved identities match the process and thread identified at the beginning of the trace event, as described in more detail above with reference to steps 316-318 of method 300 of FIG. 3. If the identities match, method 300 may proceed to step 306. If the identities do not match, method 300 may proceed to step 308. At step 308, an error code is generated, whereupon method 300 may terminate as described in more detail below with reference to step 316.

At step 306, method 300 may examine the branch records and note the code addresses. After noting the addresses, method 300 may proceed to step 308. At step 308, method 300 may examine a log of task switches to see whether a task switch occurred since start of trace event, or since the last hook handler was invoked and the branch record retrieved. If a task switch was noted, method 300 may proceed to step 310. It a task switch was not noted, method 300 may proceed to step 314.

At step 310, method 300 may examine a branch record address to determine whether it points to code associated with switching tasks. If the branch record does not point to code associated with switching tasks, method 300 may proceed to step 314. At step 314, method 300 may save the branch record address for further processing before proceeding to step 318.

At step 318, the branch record address may be examined for suitability for placing of secondary hooks. In some embodiments, this may include determining whether the code address is already monitored by a hook. If deemed suitable, method 300 may proceed to step 320, where an inline hook may placed at the identified code addresses before method 300 proceeds to step 316. If the code address is not deemed suitable, method 300 may proceed to step 316.

Referring again to step 310, if the branch record does point to code associated with switching tasks, method 300 may proceed to step 322, where method 300 may discard the location as well as any subsequent entries in the branch records, and then proceed to step 316.

At step 316, method 300 may determine whether another branch record address should be analyzed. If another exists, method 300 may select another branch record and return to step 310. If all branch record addresses have been analyzed, method 300 may terminate. In some embodiments, the termination of method 300 may include proceeding to other method steps. For example, method 300 may return to step 224 of method 300, as described in more detail above with reference to FIG. 2.

Although FIG. 3 discloses a particular number of steps to be taken with respect to method 300, method 300 may be executed with more or fewer steps than those depicted in FIG. 3. In addition, although FIG. 3 discloses a certain order of steps comprising method 300, the steps comprising method 300 may be completed in any suitable order. For example, in the embodiment of method 300 shown, one branch record address at a time is examined. However, in some configurations it may be necessary or desirable to examine a plurality of branch record addresses simultaneously.

Figure 4:
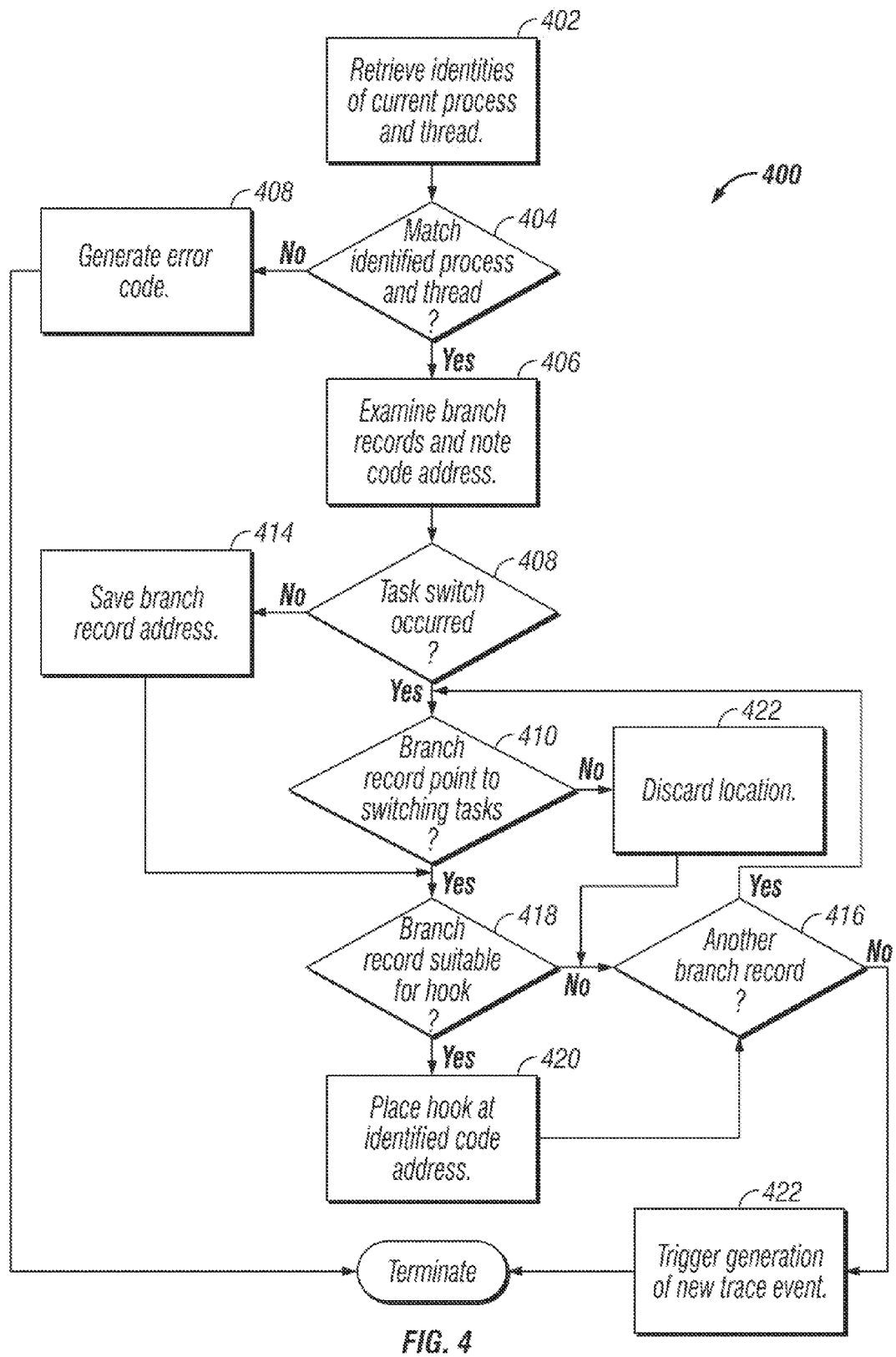
FIG. 4 illustrates a flowchart of an example method 400 for handling secondary hooks at the final portion of an event handling chain, in accordance with certain embodiments of the present disclosure.

FIG. 4 illustrates a flowchart of an example method 400 for handling secondary hooks at the final portion of an event handling chain, in accordance with certain embodiments of the present disclosure. Method 400 may include examining the branch records, discarding locations associated with switching tasks, and determining whether the branch record address is a suitable location for a hook. The steps of method 400 generally correspond with step 224 of method 200, as described in more detail above with reference to FIG. 2.

According to one embodiment, method 400 preferably begins at step 402. Teachings of the present disclosure may be implemented in a variety of configurations. As such, the preferred initialization point for method 400 and the order of steps 402-422 comprising method 400 may depend on the implementation chosen.

In some embodiments, the steps of method 400 may be performed by some or all of the components of system 100, as described in more detail above with reference to FIGS. 1-2. For example, in some configurations, inline hook engine 108 may be responsible for the handling of secondary hooks. In other configurations, these steps may be performed by branch recoding mechanism 106 and/or different components of system 100 with departing from the scope of the present disclosure.

At step 402, method 400 may retrieve the identities of the current process and thread. After retrieving the identities, method 400 may proceed to step 404. At step 404, method 400 may determine whether the retrieved identities match the process and thread identified at the beginning of the trace event, as described in more detail above with reference to steps 316-318 of method 300 of FIG. 3. If the identities match, method 400 may proceed to step 406. If the identities do not match, method 400 may proceed to step 408. At step 408, an error code is generated, whereupon method 400 may terminate as described in more detail below with reference to step 416.

At step 406, method 400 may examine the branch records and note the code addresses. After noting the addresses, method 400 may proceed to step 408. At step 408, method 400 may examine a log of task switches to see whether a task switch occurred since start of trace event, or since the last hook handler was invoked and the branch record retrieved. If a task switch was noted, method 400 may proceed to step 410. It a task switch was not noted, method 400 may proceed to step 414.

At step 410, method 400 may examine a branch record address to determine whether it points to code associated with switching tasks. If the branch record does not point to code associated with switching tasks, method 400 may proceed to step 414. At step 414, method 400 may save the branch record address for further processing before proceeding to step 418.

At step 418, the branch record address may be examined for suitability for placing of secondary hooks. In some embodiments, this may include determining whether the code address is already monitored by a hook. If deemed suitable, method 400 may proceed to step 420, where an inline hook may placed at the identified code addresses before method 400 proceeds to step 416. If the code address is not deemed suitable, method 400 may proceed to step 416.

Referring again to step 410, if the branch record does point to code associated with switching tasks, method 400 may proceed to step 422, where method 400 may discard the location as well as any subsequent entries in the branch records, and then proceed to step 416.

At step 416, method 400 may determine whether another branch record address should be analyzed. If another exists, method 400 may select another branch record and return to step 410. If all branch record addresses have been analyzed, method 400 may proceed to step 422.

At step 422, method 400 may trigger the generation of a new trace event. In some embodiments, this may include queuing for later triggering after the current trace event has completed, to limit recursion. In the same or alternative embodiments, recursive handling may be supported. After triggering the generation of a new trace event, method 400 may terminate. In some embodiments, the termination of method 400 may include proceeding to other method steps. For example, method 400 may return to step 226 of method 200, as described in more detail above with reference to FIG. 2.

Although FIG. 4 discloses a particular number of steps to be taken with respect to method 400, method 400 may be executed with more or fewer steps than those depicted in FIG. 4. In addition, although FIG. 4 discloses a certain order of steps comprising method 400, the steps comprising method 400 may be completed in any suitable order. For example, in the embodiment of method 400 shown, one branch record address at a time is examined. However, in some configurations it may be necessary or desirable to examine a plurality of branch record addresses simultaneously.

A system for assembling an execution profile of an event is disclosed. The system may include a processor; a branch recording mechanism communicatively coupled to the processor, the branch recording mechanism configured to record a plurality of branch records; a test event generator communicatively coupled to the processor, the test event generator configured to generate a first test event substantially identical to the event; a code owner locator communicatively coupled to the processor, the code owner locator configured to verify legitimacy of an owner of a code segment associated with the event; and an inline hook engine communicatively coupled to the processor. The inline hook engine may be configured to establish an initial point of an execution chain associated with the event; establish a final point of the execution chain associated with the event; analyze branch records for an address associated with the code segment; install a plurality of primary monitors within the execution chain associated with the event; and trigger the plurality of primary monitors.

The inline hook engine may be further configured to install a plurality of primary monitors by being configured to determine whether the address is suitable for a primary monitor, the primary monitor being one of the plurality of primary monitors. The inline hook engine may be further configured to install a plurality of primary monitors by being configured to discard the address if it is associated with a switching task. The inline hook engine may be further configured to install a plurality of primary monitors by being configured to verify an identity of a process associated with the execution chain. The inline hook engine may be configured to determine whether the execution profile is complete; and if the execution profile is not complete, signal the test event generator to generate a second test event substantially identical to the event. The inline hook engine may be further configured to install a plurality of primary monitors by being configured to verify an identity of a thread associated with the execution chain.

The inline hook engine may be further configured to install a plurality of secondary monitors within the execution chain associated with the event; and trigger the plurality of secondary monitors. The inline hook engine may be further configured to install a plurality of secondary monitors by being configured to determine whether the address is suitable for a secondary monitor, the secondary monitor being one of the plurality of secondary monitors. The inline hook engine may be further configured to install a plurality of secondary monitors by being configured to discard the address if it is associated with a switching task. The inline hook engine may be further configured to install a plurality of secondary monitors by being configured to verify an identity of a process associated with the execution chain. The inline hook engine may be configured to determine whether the execution profile is complete; and if the execution profile is not complete, signal the test event generator to generate a second test event substantially identical to the event.

The plurality of primary monitors may include a plurality of inline hooks, a plurality of virtualization-based monitors, and/or a plurality of hardware-based monitors.

Addresses used for placing a plurality of secondary monitors may be discovered through meanins including: an examination of a call stack at a point of invocation of an earlier-placed primary monitor or an earlier-placed secondary monitor; examination of a branch record available at a point of invocation of an earlier-placed primary monitor or an earlier-placed secondary monitor.

At least one machine readable storage medium, comprising computer-executable instructions carried on the computer readable medium, the instructions readable by a processor is disclosed. The instructions, when read and executed, for causing the processor to record a plurality of branch records, generate a first test event substantially identical to the event, verify legitimacy of an owner of a code segment associated with the event, establish an initial point of an execution chain associated with the event, establish a final point of the execution chain associated with the event, analyze branch records for an address associated with the code segment, install a plurality of primary monitors within the execution chain associated with the event, and trigger the plurality of primary monitors.

The medium may also include instructions to install a plurality of secondary monitors within the execution chain associated with the event and trigger the plurality of secondary monitors.

Installing a plurality of primary monitors may include determining whether the address is suitable for a primary monitor, the primary monitor being one of the plurality of primary monitors. Installing a plurality of primary monitors may include discarding the address if it is associated with a switching task. Installing a plurality of primary monitors may include verifying an identity of a process associated with the execution chain. Installing a plurality of primary monitors may include verifying an identity of a thread associated with the execution chain.

The medium may also include instructions to determine whether the execution profile is complete; and if the execution profile is not complete, signal the test event generator to generate a second test event substantially identical to the event.

Installing a plurality of secondary monitors may include determining whether the address is suitable for a secondary monitor, the secondary monitor being one of the plurality of secondary monitors. Installing a plurality of secondary monitors may include discarding the address if it is associated with a switching task. Installing a plurality of secondary monitors may include verifying an identity of a process associated with the execution chain.

The medium may also include instructions to determine whether the execution profile is complete; and if the execution profile is not complete, signal the test event generator to generate a second test event substantially identical to the event.

The plurality of primary monitors may include a plurality of inline hooks, a plurality of virtualization-based monitors, and/or a plurality of hardware-based monitors.

Addresses used for placing a plurality of secondary monitors may be discovered through means including: an examination of a call stack at a point of invocation of an earlier-placed primary monitor or an earlier-placed secondary monitor; examination of a branch record available at a point of invocation of an earlier-placed primary monitor or an earlier-placed secondary monitor.

A method for assembling an execution profile of an event is disclosed. The method may include recording a plurality of branch records; generating a first test event substantially identical to the event; verifying legitimacy of an owner of a code segment associated with the event; establishing an initial point of an execution chain associated with the event; establishing a final point of the execution chain associated with the event; analyzing branch records for an address associated with the code segment; installing a plurality of primary monitors within the execution chain associated with the event; and triggering the plurality of primary monitors.

The method may also include installing a plurality of secondary monitors within the execution chain associated with the event; and triggering the plurality of secondary monitors.

Installing a plurality of primary monitors may include determining whether the address is suitable for a primary monitor, the primary monitor being one of the plurality of primary monitors. Installing a plurality of primary monitors may include discarding the address if it is associated with a switching task. Installing a plurality of primary monitors may include verifying an identity of a process associated with the execution chain. Installing a plurality of primary monitors may include verifying an identity of a thread associated with the execution chain.

The method may also include determining whether the execution profile is complete; and if the execution profile is not complete, signaling the test event generator to generate a second test event substantially identical to the event.

Installing a plurality of secondary monitors may include determining whether the address is suitable for a secondary monitor, the secondary monitor being one of the plurality of secondary monitors. Installing a plurality of secondary monitors may include discarding the address if it is associated with a switching task. Installing a plurality of secondary monitors may include verifying an identity of a process associated with the execution chain.

The method may also include determining whether the execution profile is complete; and if the execution profile is not complete, signaling the test event generator to generate a second test event substantially identical to the event.

The plurality of primary monitors may include a plurality of inline hooks, a plurality of virtualization-based monitors, and/or a plurality of hardware-based monitors.

Addresses used for placing a plurality of secondary monitors may be discovered through means including: an examination of a call stack at a point of invocation of an earlier-placed primary monitor or an earlier-placed secondary monitor; examination of a branch record available at a point of invocation of an earlier-placed primary monitor or an earlier-placed secondary monitor.

What is claimed:

1. A system for securing an electronic device, the system comprising:
   a memory;
   a processor;
   a secured system resource; and
   one or more security agents for assembling an execution profile of an event, the one or more security agents including instructions resident in the memory and operable for execution by the processor, wherein the security agents are configured to:
      record a plurality of branch records;
      generate a first test event for the event;
      verify legitimacy of an owner of a code segment associated with the event;
      establish an initial point of an execution chain associated with the event;
      establish a final point of the execution chain associated with the event;
      analyze branch records for an address associated with the code segment;
      install a plurality of primary monitors within the execution chain associated with the event, including discarding the address based on a determination that is associated with an operating system context switch;
      trigger the plurality of primary monitors;
      determine whether an execution profile is complete; and
      based on a determination that the execution profile is not complete, signal a test event generator to generate a second test event for the event.

2. The system of claim 1, wherein the security agents are further configured to:
   install a plurality of secondary monitors within the execution chain associated with the event; and
   trigger the plurality of secondary monitors.

3. The system of claim 1, wherein installing the plurality of primary monitors comprises determining whether the address is suitable for a primary monitor, the primary monitor being one of the plurality of primary monitors.

4. The system of claim 1, wherein installing the plurality of primary monitors comprises verifying an identity of a process associated with the execution chain.

5. The system of claim 1, wherein the security agents are further configured to:
   install a plurality of secondary monitors within the execution chain associated with the event, wherein installing the plurality of secondary monitors comprises determining whether the address is suitable for a secondary monitor, the secondary monitor being one of the plurality of secondary monitors; and
   trigger the plurality of secondary monitors.

6. The system of claim 1, wherein the security agents are further configured to:
   install a plurality of secondary monitors within the execution chain associated with the event, wherein installing the plurality of secondary monitors comprises discarding the address if it is associated with a switching task; and
   trigger the plurality of secondary monitors.

7. The system of claim 1, wherein the security agents are further configured to:
   install a plurality of secondary monitors within the execution chain associated with the event, wherein installing the plurality of secondary monitors comprises verifying an identity of a process associated with the execution chain; and
   trigger the plurality of secondary monitors.

8. The system of claim 1, wherein the security agents are further configured to:
   install a plurality of secondary monitors within the execution chain associated with the event;
   trigger the plurality of secondary monitors;
   determine whether an execution profile is complete; and
   based on a determination that the execution profile is not complete, signal a test event generator to generate a second test event for the event.

9. The system of claim 1, wherein the plurality of primary monitors are selected from the group consisting of: a plurality of inline hooks, a plurality of virtualization-based monitors, and a plurality of hardware-based monitors.

10. A method for assembling an execution profile of an event, the method comprising:
    recording a plurality of branch records;
    generating a first test event substantially identical to the event;
    verifying legitimacy of an owner of a code segment associated with the event;
    establishing an initial point of an execution chain associated with the event;
    establishing a final point of the execution chain associated with the event;
    analyzing branch records for an address associated with the code segment;
    installing a plurality of primary monitors within the execution chain associated with the event, including discarding the address based on a determination that is associated with an operating system context switch;
    triggering the plurality of primary monitors
    determining whether the execution profile is complete; and
    based on a determination that the execution profile is not complete, signaling the test event generator to generate a second test event substantially identical to the event.

11. The method of claim 10, further comprising:
    installing a plurality of secondary monitors within the execution chain associated with the event; and
    triggering the plurality of secondary monitors.

12. The method of claim 10, wherein installing a plurality of primary monitors comprises determining whether the address is suitable for a primary monitor, the primary monitor being one of the plurality of primary monitors.

13. The method of claim 10, wherein installing a plurality of primary monitors comprises verifying an identity of a process associated with the execution chain.

14. The method of claim 10, further comprising:
    installing a plurality of secondary monitors within the execution chain associated with the event, wherein installing the plurality of secondary monitors comprises determining whether the address is suitable for a secondary monitor, the secondary monitor being one of the plurality of secondary monitors; and
    triggering the plurality of secondary monitors.

15. At least one non-transitory machine readable storage medium, comprising computer-executable instructions carried on the computer readable medium, the instructions readable by a processor, the instructions, when read and executed, for causing the processor to:
    recording a plurality of branch records;
    generate a first test event substantially identical to the event;

verify legitimacy of an owner of a code segment associated with the event;

establish an initial point of an execution chain associated with the event;

establish a final point of the execution chain associated with the event;

analyze branch records for an address associated with the code segment;

install a plurality of primary monitors within the execution chain associated with the event, including discarding the address based on a determination that is associated with an operating system context switch;

trigger the plurality of primary monitors determining whether the execution profile is complete; and based on a determination that the execution profile is not complete, signaling the test event generator to generate a second test event substantially identical to the event.

16. The medium of claim 15, wherein the processor is further caused to:

install a plurality of secondary monitors within the execution chain associated with the event; and trigger the plurality of secondary monitors.

17. The medium of claim 15, wherein installing a plurality of primary monitors comprises determining whether the address is suitable for a primary monitor, the primary monitor being one of the plurality of primary monitors.

18. The medium of claim 15, wherein installing a plurality of primary monitors comprises verifying an identity of a process associated with the execution chain.

* * * * *